United States Patent
Aizawa et al.

(10) Patent No.: US 8,337,732 B2
(45) Date of Patent: Dec. 25, 2012

(54) METHOD FOR FABRICATING A POLYMER ELECTROLYTE MEMBRANE FOR A FUEL CELL

(75) Inventors: Masato Aizawa, Kyoto (JP); Hisaaki Gyoten, Osaka (JP); Akira Taomoto, Kyoto (JP)

(73) Assignee: Panasonic Corporation, Osaka (JP)

( * ) Notice: Subject to any disclaimer, the term of this patent is extended or adjusted under 35 U.S.C. 154(b) by 61 days.

(21) Appl. No.: 13/110,656

(22) Filed: May 18, 2011

(65) Prior Publication Data
US 2011/0250526 A1   Oct. 13, 2011

Related U.S. Application Data

(63) Continuation of application No. PCT/JP2010/073479, filed on Dec. 17, 2010.

(30) Foreign Application Priority Data

Feb. 4, 2010 (JP) ................................. 2010-022936

(51) Int. Cl.
B29C 33/42 (2006.01)
H01M 2/18 (2006.01)
(52) U.S. Cl. ........................................ 264/104; 264/219
(58) Field of Classification Search .................. None
See application file for complete search history.

(56) References Cited

U.S. PATENT DOCUMENTS

| 2003/0170519 A1 | 9/2003 | Mittelstadt et al. |
| 2008/0213644 A1 | 9/2008 | Shindoh et al. |
| 2009/0173442 A1 | 7/2009 | Suzuki |

FOREIGN PATENT DOCUMENTS

| JP | 2003-317735 | 11/2003 |
| JP | 2005-053198 | 3/2005 |

(Continued)

OTHER PUBLICATIONS

Zhilian Zhou et al., "Molded, High surface Area Polymer Electrolyte Membranes from Cured Liquid Precursors," Journal of the American Chemical Society, 2006, vol. 128, pp. 12963-12972.

Primary Examiner — Mary F Theisen
(74) Attorney, Agent, or Firm — McDermott Will & Emery LLP (57) ABSTRACT

In order to significantly improve power generation efficiencies for the fuel cells, the present invention provides a method for fabricating a polymer electrolyte membrane comprising a surface with an array of a plurality of fine convex portion with a depth of not less than 3 μm and not more than 12 μm and an aspect ratio of not less than 0.4 and not more than 2.0,
said method comprising the steps of (A) to (E),
(A) preparing a mold comprising a surface with an array of a plurality of fine concave portions, wherein,
each of said fine concave portions comprises a bottom and a side wall,
each of said bottoms and said side walls are hydrophilic,
each of side walls is smooth,
each of said concave portions has a depth of not less than 3 μm and not more than 12 μm and an aspect ratio of not less than 0.4 and not more than 2.0,
(B) supplying a hydrophilic polymer electrolyte solution to the surface,
(C) solidifying said hydrophilic polymer electrolyte solution to form a polymer electrolyte membrane,
(D) immersing said polymer electrolyte membrane into a hydrophilic liquid, and
(E) peeling off said polymer electrolyte membrane from the mold in said hydrophilic liquid to form said polymer electrolyte membrane comprising said surface with said array of a plurality of fine convex portion with a depth of not less than 3 μm and not more than 12 μm and an aspect ratio of not less than 0.4 and not more than 2.0.

4 Claims, 10 Drawing Sheets

FOREIGN PATENT DOCUMENTS

| | | |
|---|---|---|
| JP | 2005-174565 | 6/2005 |
| JP | 2005-174620 | 6/2005 |
| JP | 2006-196413 | 7/2006 |
| JP | 2008-004486 | 1/2008 |
| JP | 2008-159426 | 7/2008 |
| WO | WO 2005/086632 A2 | 9/2005 |

METHOD FOR FABRICATING A POLYMER ELECTROLYTE MEMBRANE FOR A FUEL CELL

RELATED APPLICATIONS

This is a continuation application under 35 U.S.C. 111(a) of pending prior International application No. PCT/JP2010/073479, filed on Dec. 17, 2010, which claims priority of Japanese Patent Application No. 2010-022936 filed on Feb. 4, 2010, the disclosures of which applications are incorporated by reference herein.

TECHNICAL FIELD

The present invention relates to a method for fabricating a polymer electrolyte membrane.

BACKGROUND ART

Patent Document 1 discloses a solid-polymer-type fuel cell comprising a polymer electrolyte membrane with a plurality of fine convex portions on its surface. The fine convex portions increase a reaction area and improve an efficiency of a catalyst. Patent Document 1 discloses press-molding method and casting method to form the fine convex portions on the surface of the polymer electrolyte membrane.

In the casting method, an electrolyte solution containing a polymer electrolyte or its precursor as well as a solvent is cast on a mold with a plurality of fine concave portions on its surface. Subsequently, a solidified polymer electrolyte membrane is peeled off from the mold. The resultant polymer electrolyte membrane comprises a mirror-structure of the mold on its surface.

Patent Document 2 and Non-patent Document 1 disclose a method for forming a polymer electrolyte with a plurality of fine convex portions. According to these documents, an electrolyte solution containing a monomer of a polymer electrolyte membrane and a polymeric initiator is cast on a mold made from polycyanomethylacrylate with a plurality of fine concave portions. Subsequently, the monomer is polymerized by irradiating ultraviolet, and a solidified polymer electrolyte membrane is peeled off from the mold.

Patent Document 3 discloses a method for fabricating a polymer electrolyte membrane comprising a catalyst layer with a plurality of fine convex portions. According to Patent document 3, the polymer electrolyte membrane is fabricated by dropping a polymer electrolyte aqueous solution on an alumina-nano-hole array comprising a catalyst layer and coating a polymer electrolyte membrane thereon.

Patent Document 4 discloses a method for forming a plurality of fine convex portions on the surface of polyimide fluoride resin using a casting method, as a method for forming a membrane of a resin other than polymer electrolyte membrane for fuel cell. According to Patent Document 4, hydrophilic treatment is conducted on the surface of a silicon mold with a plurality of fine concave portions, and a solution containing resin monomer is cast on the silicon mold. Subsequently, the resin monomer is polymerized with heat, and immersed in warm water. Finally, the resultant polyimide fluoride resin is peeled off from the mold. The hydrophilic treatment weakens the adherence between the solidified resin and the silicon mold, and promotes the peeling.

CITATION LIST

[Patent Documents]
[Patent Document 1] Japanese Laid-Open publication No. 2005-174620
[Patent Document 2] Japanese Laid-Open publication No. 2007-525802
[Patent Document 3] Japanese Laid-Open publication No. 2006-196413
[Patent Document 4] Japanese Laid-Open publication No. 2005-053198
[Non-Patent Document]
[Non-Patent Document 1] Zhilian Zhou et. al. "Molded, High surface Area Polymer Electrolyte Membranes from Cured Liquid Precursors", Journal of the American Chemical Society, 2006, vol. 128, pp. 12963-12972

SUMMERY OF INVENTION

Technical Problems

However, the casting method disclosed in Patent Document 2 and non-patent document 1 requires many steps including the step of a forming a electrolyte membrane by polymerizing a monomer to form the plurality of the fine convex portions on the surface of the polymer electrolyte membrane with a thickness of not less than 30.

The casting method disclosed in Patent Document 3 fails to require polymeric initiator and ultraviolet. However, since the polymer electrolyte membrane with the plurality of fine convex portions formed with the casting method is too thin, it requires to be attached with other two polymer electrolyte membranes.

According to Patent Document 4, resin monomer solution to be cast is hydrophilic, whereas the silicon mold is hydrophobic. Thus, the adherence between the resin monomer solution and the mold is low. When the concave portion of the mold has a thickness of not less than 3 μm, the resin monomer solution fails to be filled up to the concave portion. Thus, the fine convex portions with a thickness of not less than 3 μm can not be formed.

Solution to Problems

The present method for fabricating a polymer electrolyte membrane for a fuel cell is provided to solve the above problems. The purpose of the present invention is to provide a polymer electrolyte membrane comprising a surface with a plurality of fine convex portions with a height of 3 to 12 μm and an aspect ratio of 0.4 to 2.0, using a casting method using only a polymer electrolyte solution and a mold. The polymer electrolyte membrane increases a reaction area and improves the efficiency of transferring a proton to a cathode catalyst layer. This improves the efficiency of generating electric power by the fuel cell.

Particularly, the present invention provides a method for fabricating a polymer electrolyte membrane comprising a surface with an array of a plurality of fine convex portion with a depth of not less than 3 μm and not more than 12 μm and an aspect ratio of not less than 0.4 and not more than 2.0, said method comprising the steps of (A) to (E), (A) preparing a mold comprising a surface with an array of a plurality of fine concave portions, wherein, each of said fine concave portions comprises a bottom and a side wall, each of said bottoms and said side walls are hydrophilic, each of side walls is smooth, each of said concave portions has a depth of not less than 3 μm and not more than 12 μm and an aspect ratio of not less than 0.4 and not more than 2.0, (B) supplying a hydrophilic polymer electrolyte solution to the surface, (C) solidifying said hydrophilic polymer electrolyte solution to form a polymer electrolyte membrane, (D) immersing said polymer electrolyte membrane into a hydrophilic liquid, and (E) peeling off said polymer electrolyte membrane from the mold in said hydrophilic liquid to form said polymer electrolyte membrane comprising said surface with said array of a plurality of fine convex portion with a depth of not less than 3 μm and not more than 12 μm and an aspect ratio of not less than 0.4 and not more than 2.0.

Advantageous Effects of Invention

The present fabrication method is capable of fabricating a polymer electrolyte membrane with a plurality of fine convex portions on its surface by a simple casting method using only a polymer electrolyte solution and a mold. The fine convex portions increase reaction surface areas for a fuel cell as well as promote proton transportations throughout a cathode catalyst layer. As a result, power generation efficiencies for the fuel cells are significantly improved.

DESCRIPTION OF EMBODIMENTS

Appropriate examples are explained below in order to further clarify constituents and effects of the present invention.

Embodiment 1

Figure 1:
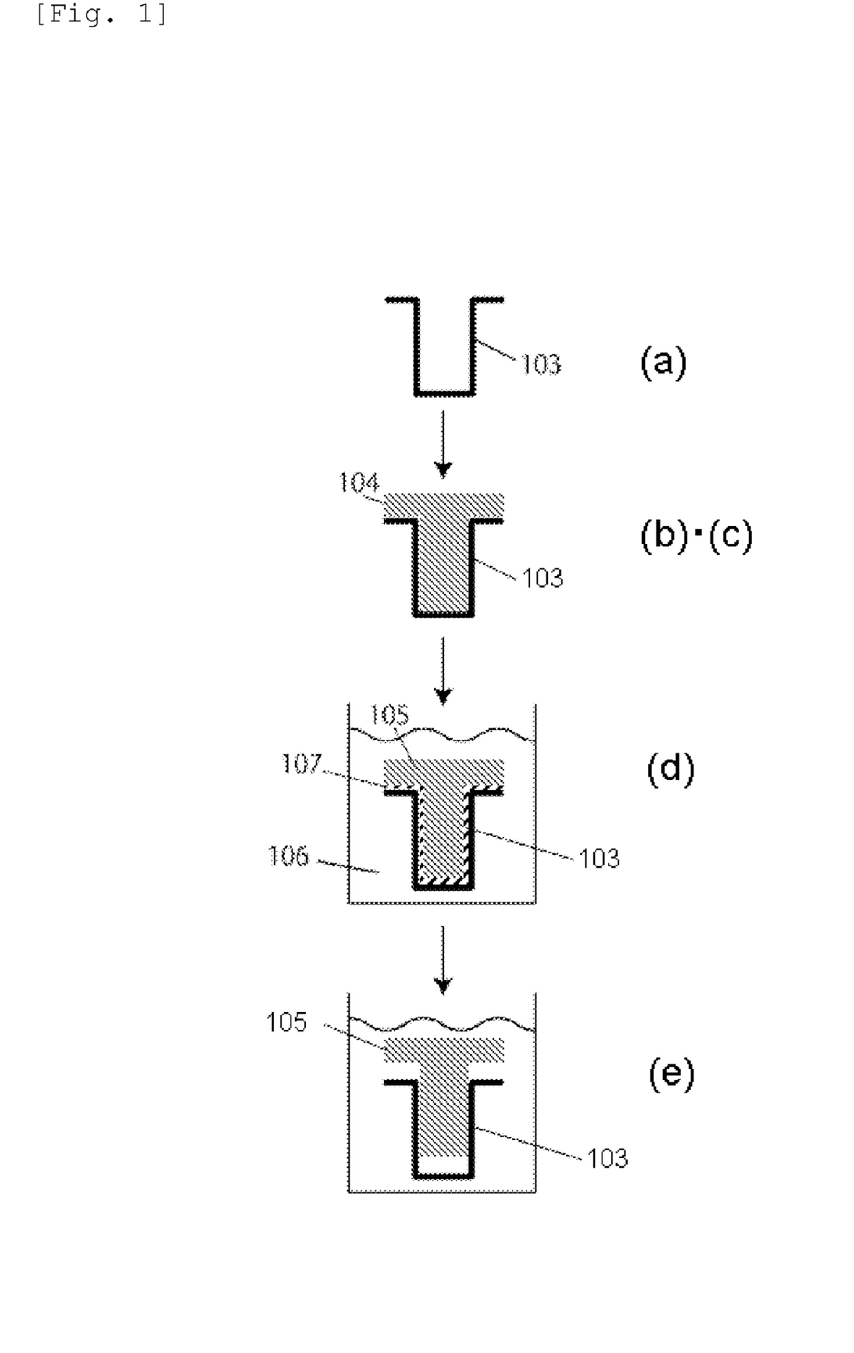
FIG. 1 shows the present fabrication process for a polymer electrolyte membrane.

FIG. 1 shows the present fabrication process of a polymer electrolyte membrane for a fuel cell.

In the step (A), a mold 103 comprising a surface with an array of a plurality of fine concave portions is prepared. Each of the fine concave portions comprises a bottom and side walls which are hydrophilic. Each of side walls is smooth. Each of the concave portions has a depth of not less than 3 μm and not more than 12 μm and an aspect ratio of not less than 0.4 and not more than 2.0.

Methods for fabricating the mold 103 are below. In one method, a plurality of the fine concave portions are formed on the surface of a hydrophobic substrate with BOSCH etching process to form a hydrophobic mold. The BOSCH etching process is a process to form a deep hole on the surface of a substrate. Subsequently, hydrophilic treatment is conducted on a bottom and a side wall of the fine concave portions with UV-ozone treatment to form the mold 103. In another method, a plurality of the fine concave portions are formed on the substrate of a hydrophilic substrate with BOSCH etching process to form the mold 103.

BOSCH etching process enables a formation of the fine concave portion with a smooth side wall. Particularly, the side wall has mean surface roughness (Ra) of not more than 0.05 μm. Such a smooth side wall prevents the polymer electrolyte membrane from being stuck in the mold 103 and protects its fine convex portions when the polymer electrolyte membrane is removed from the mold in the step (E).

The term "hydrophilic" in the present specification means that a contact angle of water on the mold 103 is not more than 20 degrees.

In the step (B), a hydrophilic polymer electrolyte solution 104 is supplied to the surface of the mold 103. Namely, the polymer electrolyte solution 104 is cast over the mold 103. The polymer electrolyte solution 104 contains a polymer electrolyte and a hydrophilic solvent. It is preferred that the solvent of the polymer electrolyte solution 104 is water, dimethylformamide, or dimethylacetoamide.

When the polymer electrolyte solution 104 is cast over the mold, it fills up the concave portions of the mold 103 because of a hydrophilic interaction. As a result, a polymer electrolyte solution 104 has a mirror structure of the mold 103.

In the step (C), the polymer electrolyte solution 104 is solidified to form a polymer electrolyte membrane 105. Particularly, the polymer electrolyte solution 104 is dried in ambient conditions. Subsequently, a polymer electrolyte membrane 105 formed on the mold 103 is heated and dried at high temperatures.

In the step (D), the polymer electrolyte membrane 105 formed on the mold 103 is immersed in a vessel containing a hydrophilic liquid 106. Namely, the polymer electrolyte membrane 105 is immersed to the vessel in a state of being attached to the mold 103. Preferably, the hydrophilic liquid 106 is water.

In the step (E), the polymer electrolyte membrane 105 is peeled off from the mold 103 in the hydrophilic liquid 106. Thus, formed is the polymer electrolyte membrane comprising said surface with the array of a plurality of fine convex portion with a depth of not less than 3 μm and not more than 12 μm and an aspect ratio of not less than 0.4 and not more than 2.0.

The hydrophilic liquid 106 enters into the interface between the polymer electrolyte membrane 105 and the mold 103 which are strongly adhered to each other due to a hydrophilic interaction. Since A hydrophilic liquid 107 between the polymer electrolyte membrane 105 and the mold 103 weakens the strong adhesion. This allows removal of the polymer electrolyte membrane 105 to be easier.

Figure 2:
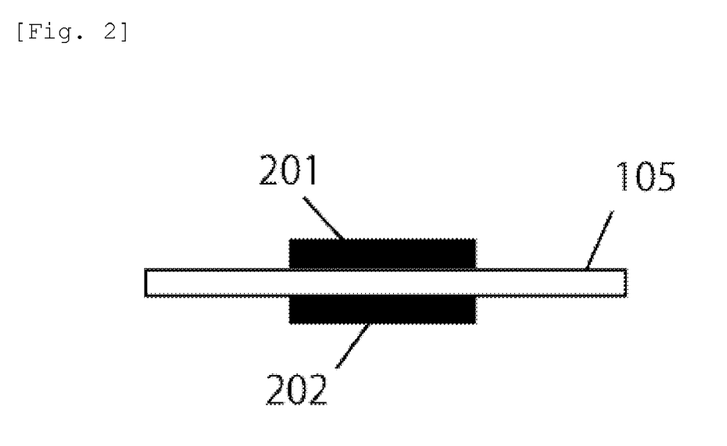
FIG. 2 shows an illustration of a membrane electrode assembly utilizing the present polymer electrolyte membrane.
Figure 3:
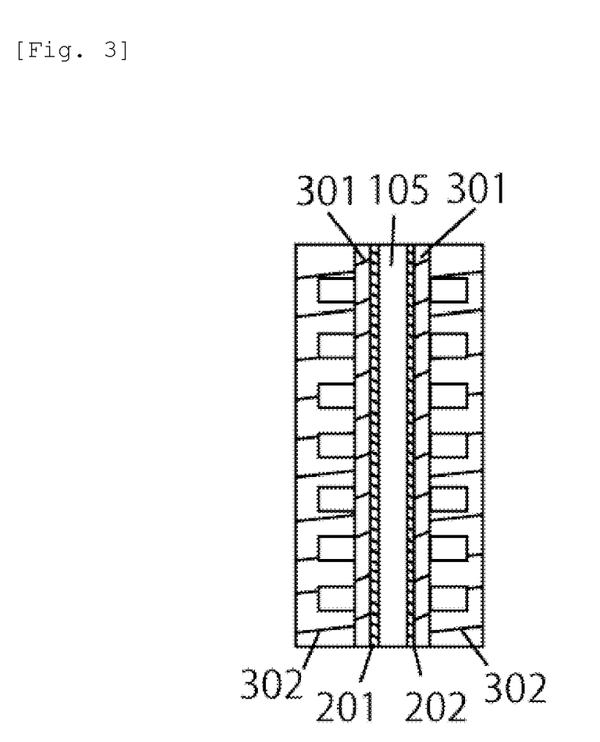
FIG. 3 shows an illustration of the present fuel cell.

FIG. 2 shows a cross section of a membrane electrode assembly fabricated by coating a platinum supported catalyst on both surfaces of a polymer electrolyte membrane shown in 105. 201 and 202 represent the catalyst layers for the cathode and the anode, respectively. FIG. 3 shows an illustration of a fuel cell utilizing the membrane electrode assembly indicated in FIG. 2. 301 and 302 are a gas diffusion layer and a separator with flow paths for providing hydrogen and air as fuels, respectively. By investigating current-voltage performances of the fuel cell shown in FIG. 3, properties of the fuel cell utilizing a polymer electrolyte membrane with a fine convex structure are examined.

EXAMPLE 1

Figure 4:
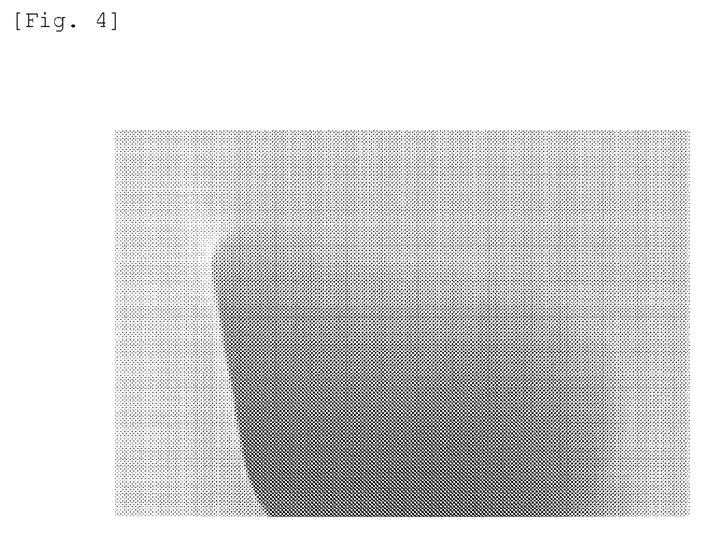
FIG. 4 shows an electron microscopy image of a silicon mold in example 1.

A silicon mold was fabricated by forming a periodic fine concave structure on the center of a single crystal silicon wafer with 15 cm in diameter using photolithography. A region having the fine structure was 6 cm×6 cm on the mold. The concave portion was a four-sided pillar shaped hole with 7.5 μm in width, 15 μm in pitch, and 3 μm in depth. Two extra molds were also fabricated with increasing the concave depth to be 7.5 μm and 11 μm. FIG. 4 shows a smoothed side wall of the fine concave portion fabricated by the Bosch method. Mean surface roughness of the side wall was not more than 0.05 μm by electron microscopy analysis. The molds underwent a hydrophilic treatment via a UV-ozone cleaning at 110° C. for 10 min. A contact angle of water on the mold was not more than 20 degrees after the hydrophilic treatment. In addition to a UV-ozone cleaning, the RCA cleaning and an oxygen plasma treatment were also able to make the mold surface hydrophilic.

Nine ml of a perfluorosulfonated polymer electrolyte solution using water as a solvent (concentration: 20%, equivalent weight: 700) was cast over the hydrophilic silicon mold. Since the polymer electrolyte solution and the mold were both hydrophilic, the polymer solution filled up the fine concave portions on the mold by a hydrophilic interaction. A colorless and transparent polymer electrolyte membrane was formed on the mold by leaving the polymer electrolyte solution in ambient conditions overnight. The membrane on the mold was heated in vacuum at 150° C. for 1 h to remove a small amount of water existed in the membrane.

Figure 5:
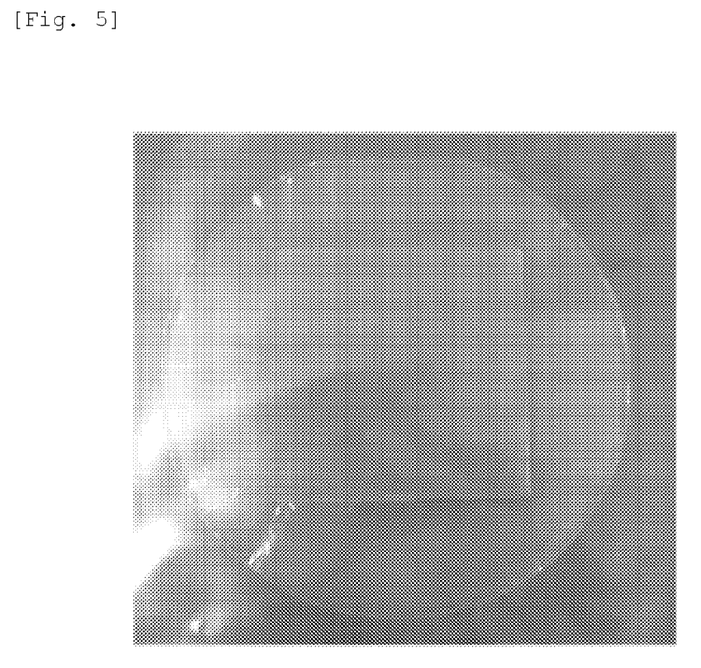
FIG. 5 shows an optical microscopy image of a polymer electrolyte membrane in example 1.

After cooling the heated membrane to room temperatures, the membrane was immersed in pure water. A few minutes later, the membrane was gradually peeled off from the mold in the water. After water droplets on the peeled membrane were wiped by tissues, the membrane was dried in a nitrogen flowing desiccator. FIG. 5 shows an optical microscopy image of the membrane. The membrane removal became easier when it is performed in water since the membrane adhesion to the mold was weakened by water entering into the interface between the membrane and the mold.

Figure 6:
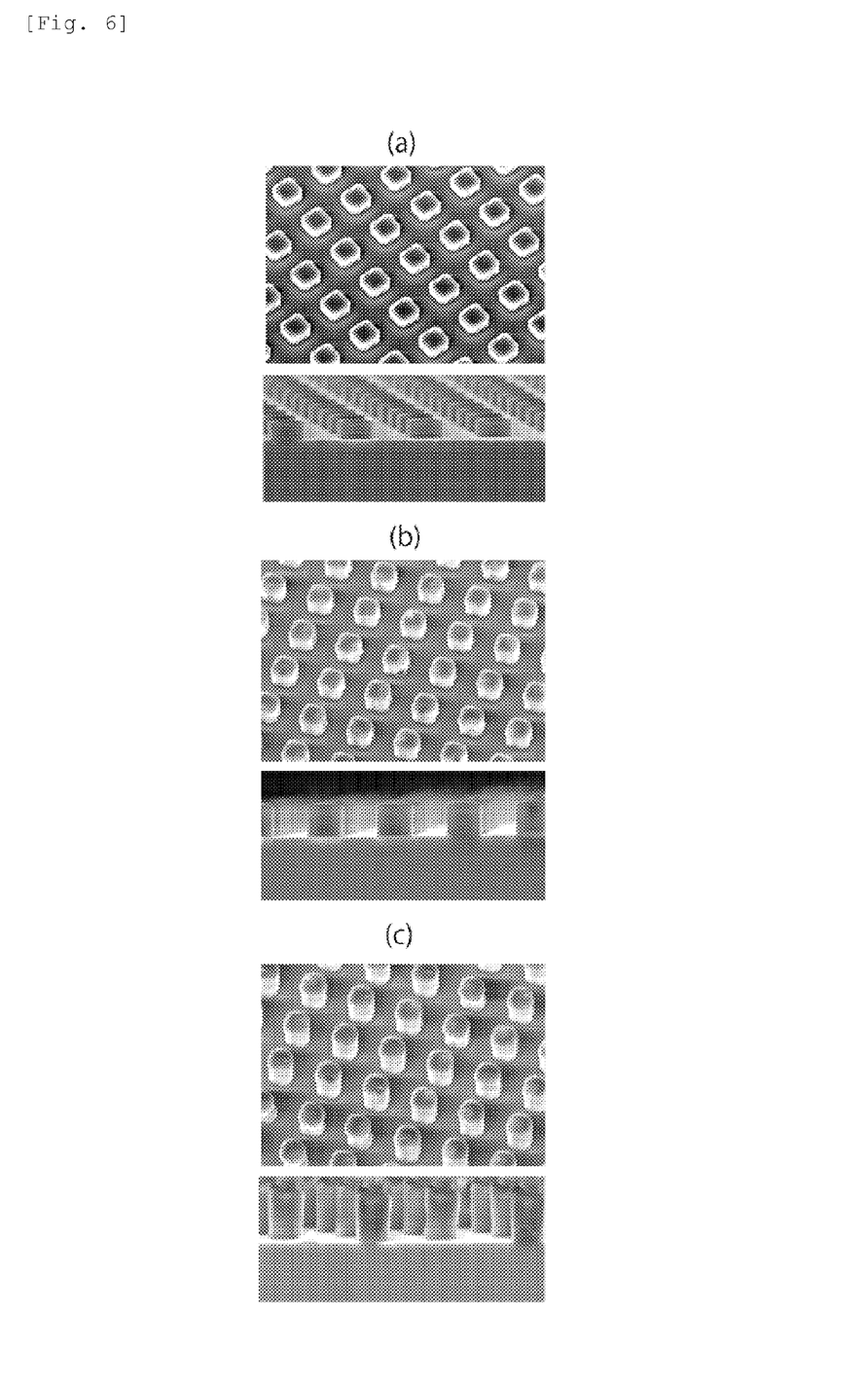
FIG. 6 shows electron microscopy images of a polymer electrolyte membrane in Example 1.

FIG. 6 shows electron microscopy images of polymer electrolyte membranes with different convex heights of 3.0 μm (a), 7.5 μm (b), and 11.0 μm (C), respectively. The convex portions formed on the membrane exactly mirror the corresponding mold structures. The aspect ratios of the convex portions were 0.4 (a), 1.0 (b), and 1.5 (c), respectively. The average thickness of each membrane excluding the convex portion was 55 μm.

Platinum nanoparticles supported on Ketchen black with a platinum weight ratio of 50% (Tanaka Kikinzoku Group) were utilized for cathode and anode catalysts. A catalyst ink was produced by mixing Nafion solution with adjusting a polymer concentration to be 20% (equivalent weight: 1100) into the supported platinum catalyst. A membrane electrode assemble (MEA) was fabricated by spraying the catalyst ink on both surfaces of a membrane with a fine convex structure. A surface of the membrane with the convex structure was used for the cathode side. The MEA was hot pressed between two stainless steel plates at 100° C. and 1 MPa for 5 min to improve the catalyst adhesion to the membrane.

Figure 7:
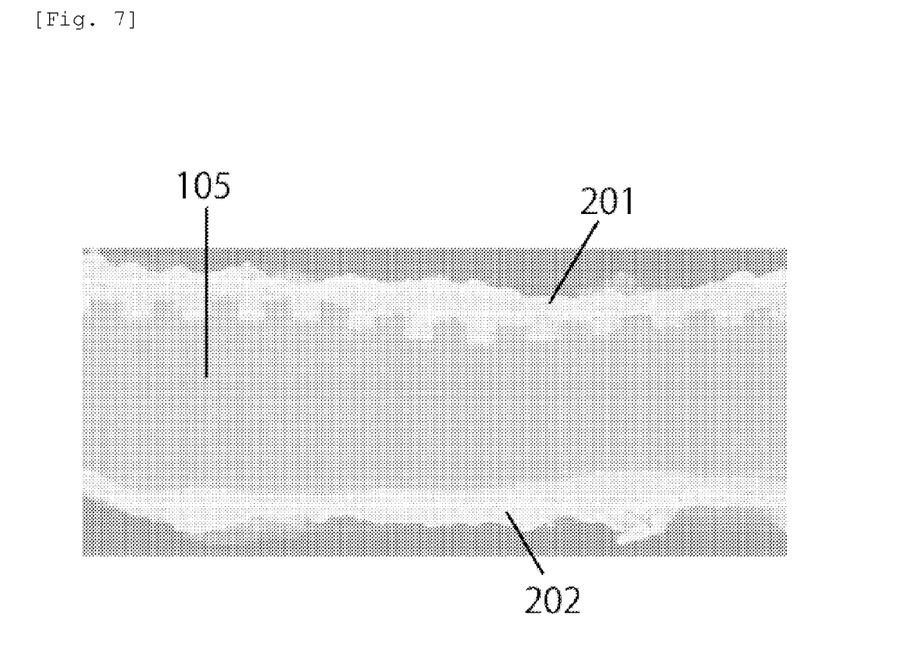
FIG. 7 shows an electron microscopy image of a cross section of a membrane electrode assembly in example 1.

FIG. 7 shows a cross section of an electron microscopy image for a MEA fabricated by the membrane shown in FIG. 6(b). As shown in FIG. 7, the convex portions on the membrane extended over the cathode layer.

Figure 8:
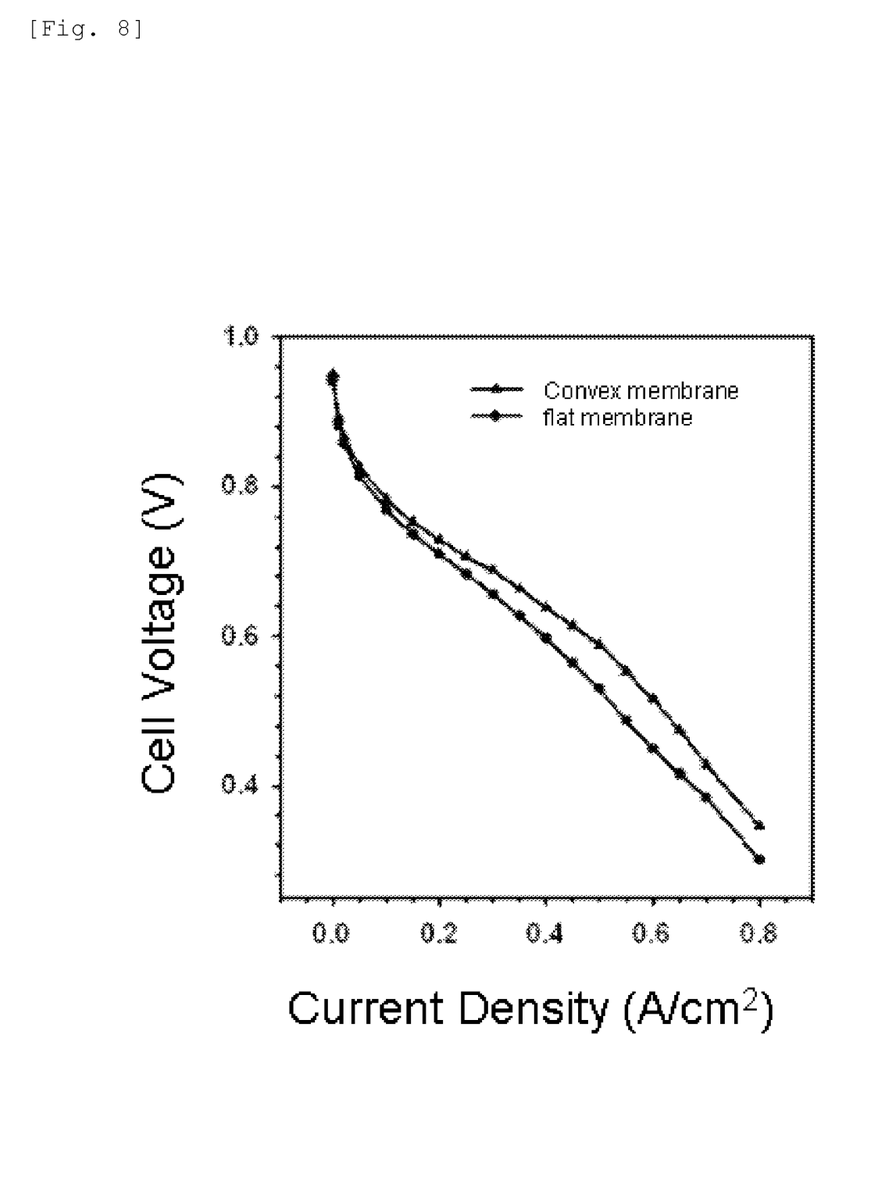
FIG. 8 shows a graph showing current-voltage curves for fuel cells utilizing a polymer electrolyte membrane with a fine convex structure and a conventional flat polymer electrolyte membrane in example 1.

A performance of a fuel cell utilizing the membrane shown in FIG. 6(c) was compared with that utilizing a conventional flat membrane. The flat membrane was fabricated by the same process mentioned above, however, a flat silicon wafer was used as a casting substrate. FIG. 8 shows a comparison of current-voltage curves for the fuel cells. The data were taken at a cell temperature of 90° C. and a relative humidity of 35%. The gas utilization rates were set to be 70% for hydrogen and 50% for air, respectively. As shown in FIG. 8, the fuel cell utilizing the membrane with the fine convex structure outperformed that with the flat membrane.

EXAMPLE 2

Figure 9:
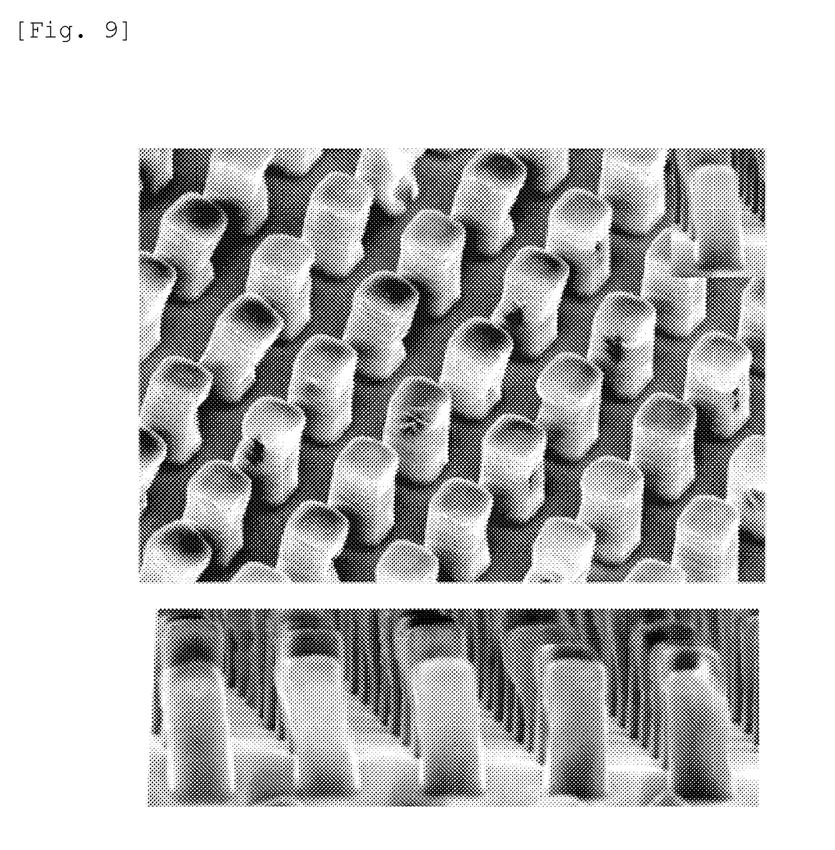
FIG. 9 shows electron microscopy images of a polymer electrolyte membrane in example 2.

The dimension of the fine concave structure on the silicon mold used in example 1 was changed in order to form a fine convex structure with a higher aspect ratio on a polymer electrolyte membrane. A fine concave structure on a new mold had a width of 6 μm, a pitch of 15 μm, and a depth of 12 μm. By using the mold, a polymer electrolyte membrane was fabricated via the same process as example 1. FIG. 9 shows a fabricated membrane with a fine convex structure. The fine convex structure formed was 6 μm in width, 15 μm in pitch, and 12 μm in height. An aspect ratio of the convex portion was 2.0.

EXAMPLE 3

A rotary evaporator was used to evaporate the water (solvent) in the perfluorosulfonated polymer electrolyte solution used in example 1. The polymer electrolyte obtained after the water evaporation was again dissolved in dimethylformamide or dimethylacetoamide in such a way that the polymer concentration become 20%. The same membranes shown in FIG. 6 and FIG. 9 were also fabricated from the polymer electrolyte solutions using the hydrophilic organic solvents. The fine convex portions formed are heights of 3 to 12 μm and aspect ratios of 0.4 to 2.0.

COMPARATIVE EXAMPLE 1

Figure 10:
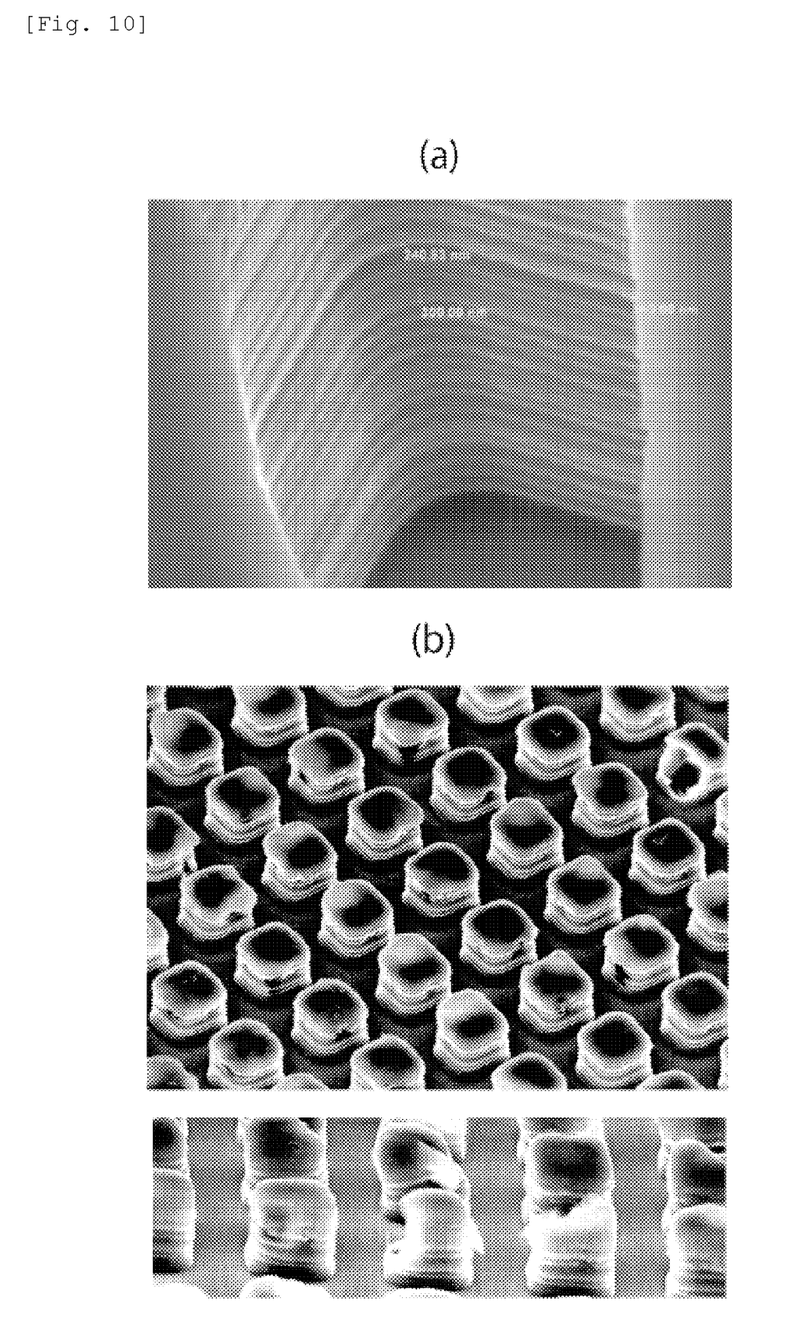
FIG. 10 shows electron microscopy images of a fine concave portion on a silicon mold (a) and a polymer electrolyte membrane (b) in comparison 1.

A new silicon mold was fabricated by changing the dimension of the fine concave structure on the silicon mold used in Example 1. A fine concave structure of the new silicon mold had a width of 10 μm, a pitch of 15 μm, and a depth of 7.5 μm. The concave portions were fabricated without the Bosch method. FIG. 10(a) shows a side wall of a concave portion on the mold. A rough surface structure was observed on the side wall. According to electron microscopy analysis, mean surface roughness of the side wall was 0.3 μm. A polymer electrolyte membrane with a fine convex structure was fabricated using the mold in the same way as example 1. FIG. 10(b) shows a surface structure of the membrane. Many defects and a rough surface structure transferred from the mold were found on the fine convex portions.

COMPARATIVE EXAMPLE 2

Figure 11:
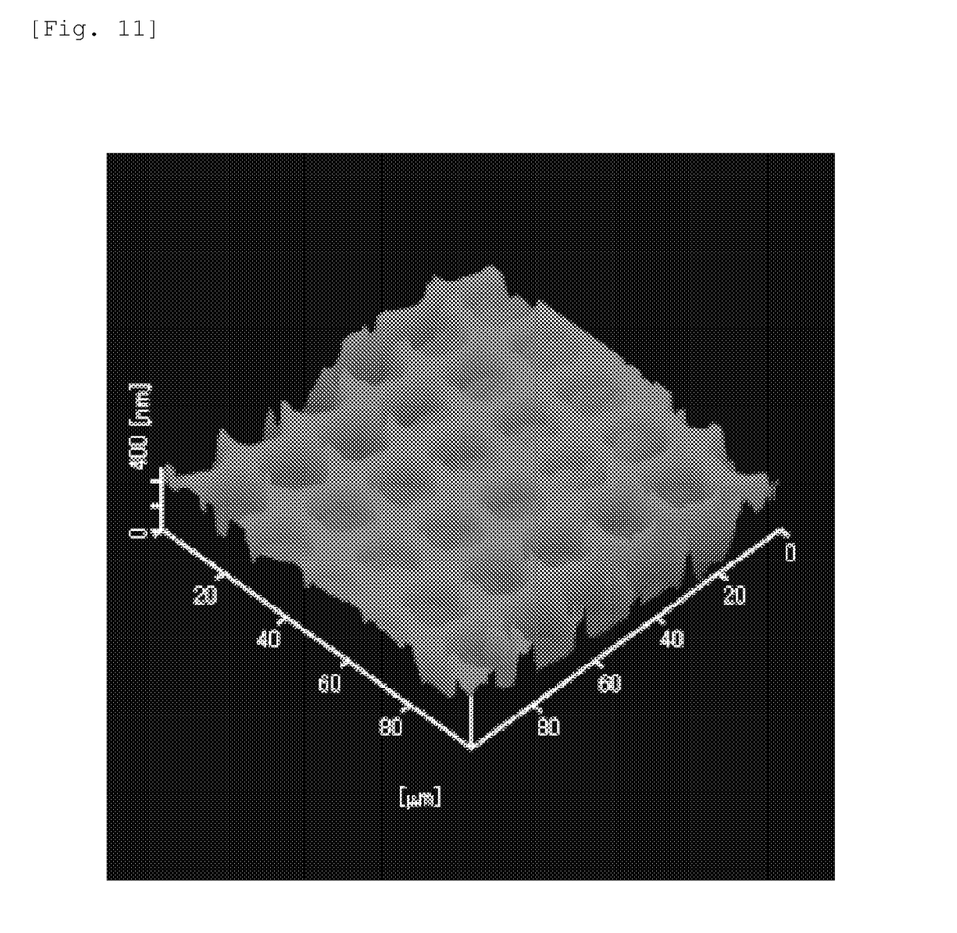
FIG. 11 shows an atomic force microscopy image of a polymer electrolyte membrane shown in comparison 2.

No hydrophilic treatment via a UV-ozone cleaning was performed on the mold having a fine concave structure with a width of 7.5 μm, a pitch of 15 μm, and a depth of 7.5 μm, as used in example 1. A contact angle of water on the mold was 80 degrees. A polymer electrolyte membrane with a fine convex structure was fabricated in the same fashion as example 1. FIG. 11 shows an atomic force microscopy image of the membrane. Since the mold and the polymer electrolyte solution cast were hydrophobic and hydrophilic, respectively, the polymer electrolyte solution didn't fill up the fine concave portions on the mold. Therefore, no fine convex structure mirroring the mold was formed on the membrane.

COMPARATIVE EXAMPLE 3

Figure 12:
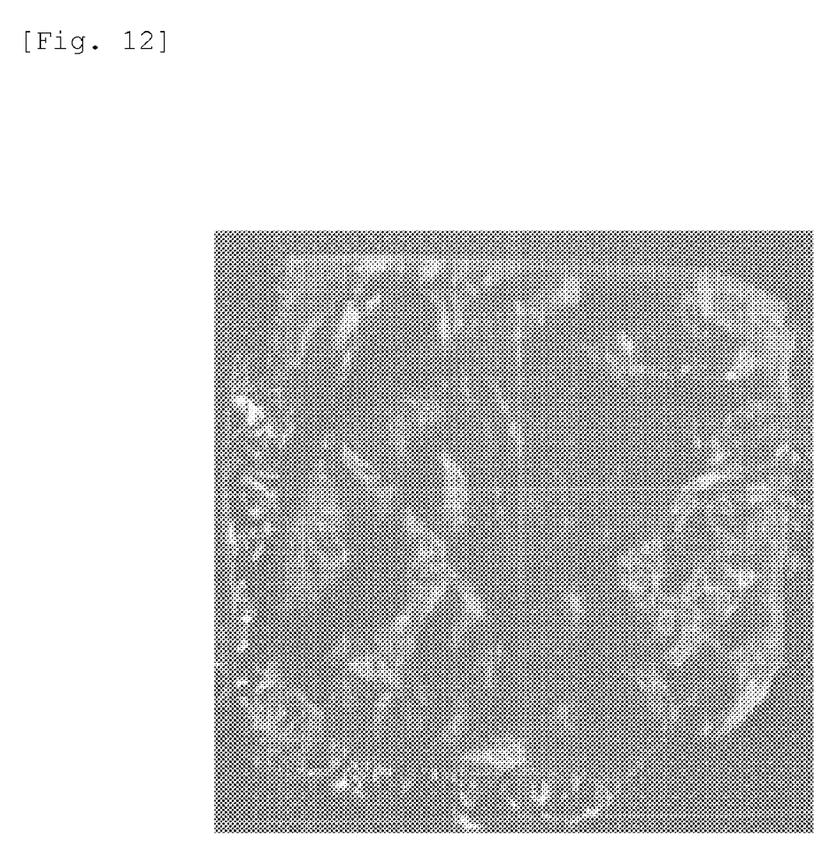
FIG. 12 shows an optical microscopy image of a polymer electrolyte membrane in comparison 3.

A membrane removing process from the mold in example 1 was performed in ambient conditions, instead of in water. FIG. 12 shows an optical microscopy image of the membrane. In case of the membrane removal in ambient conditions, the membrane was partly broken. This was caused by the strong adhesion of the membrane to the mold, which lead to the difficult peeling process.

COMPARATIVE EXAMPLE 4

A membrane removal process from the mold in example 1 was performed in a vessel containing ethanol or acetone, instead of water. Since the membrane had tendencies to be swelled and dissolved in ethanol and acetone, respectively, no membrane with desired fine structures was fabricated.

INDUSTRIAL APPLICABILITY

The present invention provides a method for fabricating a polymer electrolyte membrane with a fine convex portion on its surface.

REFERENCE SIGNS LIST

103: A mold
104: A polymer electrolyte solution
105: polymer electrolyte membrane
106: a hydrophilic liquid
107: a hydrophilic liquid between the polymer electrolyte membrane 105 and the mold 103
201: A cathode catalyst layer
202: An anode catalyst layer
301: A gas diffusion layer
302: A separator

The invention claimed is:

1. A method for fabricating a polymer electrolyte membrane comprising a surface with an array of a plurality of fine convex portion with a depth of not less than 3 μm and not more than 12 μm and an aspect ratio of not less than 0.4 and not more than 2.0,
    said method comprising the steps of (A) to (E),
    (A) preparing a mold comprising a surface with an array of a plurality of fine concave portions, wherein,
    each of said fine concave portions comprises a bottom and a side wall,
    each of said bottoms and said side walls are hydrophilic,
    each of side walls is smooth,
    each of said concave portions has a depth of not less than 3 μm and not more than 12 μm and an aspect ratio of not less than 0.4 and not more than 2.0,
    (B) supplying a hydrophilic polymer electrolyte solution to the surface,
    (C) solidifying said hydrophilic polymer electrolyte solution to form a polymer electrolyte membrane,
    (D) immersing said polymer electrolyte membrane into a hydrophilic liquid, and
    (E) peeling off said polymer electrolyte membrane from the mold in said hydrophilic liquid to form said polymer electrolyte membrane comprising said surface with said array of a plurality of fine convex portion with a depth of not less than 3 μm and not more than 12 μm and an aspect ratio of not less than 0.4 and not more than 2.0.

2. The method of claim 1, wherein said side wall has mean surface roughness of not more than 0.05 μm.

3. The method of claim 1, wherein both of said bottoms and said side walls has water contact angle of not more than 20 degrees.

4. The method of claim 1, wherein said hydrophilic liquid is water.

* * * * *